United States Patent [19]
Childers et al.

[11] 3,903,201
[45] Sept. 2, 1975

[54] SUSPENSION POLYMERIZATION PROCESS

[75] Inventors: Clifford W. Childers; Earl Clark, both of Bartlesville, Okla.

[73] Assignee: Phillips Petroleum Company, Bartlesville, Okla.

[22] Filed: Nov. 15, 1972

[21] Appl. No.: 306,592

[52] U.S. Cl. .................................. 260/880 B
[51] Int. Cl. .............................. C08f 19/08
[58] Field of Search ................ 260/880 B, 879

[56] References Cited
UNITED STATES PATENTS

| | | |
|---|---|---|
| 3,281,383 | 10/1966 | Zelinski et al. .................. 260/880 B |
| 3,442,981 | 5/1969 | Stafford et al. .................. 260/880 B |
| 3,485,894 | 12/1969 | Porter .............................. 260/880 B |
| 3,536,784 | 10/1970 | Skendrovich et al. ........... 260/880 B |
| 3,637,554 | 1/1972 | Childers .......................... 260/880 B |

*Primary Examiner*—Joseph L. Schofer
*Assistant Examiner*—P. R. Michl

[57] ABSTRACT

Suspension polymerization of branched block conjugated diene/monovinyl substituted aromatic copolymers dissolved in vinylidene group containing monomers, such as styrene and acrylonitrile, results in high impact plastic compositions without need for crosslinking.

22 Claims, No Drawings

SUSPENSION POLYMERIZATION PROCESS

The invention relates to high impact plastic compositions. In another aspect, the invention relates to suspension polymerization systems.

BACKGROUND OF THE INVENTION

Polymerization of vinylidene group-containing monomers in the presence of elastomers has been practiced utilizing latex systems, bulk polymerization systems, by combination methods in which vinylidene group-containing monomers are bulk polymerized to a low degree of conversion and the partially polymerized mixture then emulsified, or put into a suspension, for further polymerization, or by polymerizing a rubber-in-monomer solution in a suspension polymerization system by means of a peroxide initiator.

The product obtained has been required to be crosslinked in a subsequent step in order to obtain desired high impact strength characteristics. Such added step heretofore has been a necessary, but expensive added manufacturing cost.

Needed are simplified processes for producing high impact plastic compositions. Simplifying the number of steps, or reducing the number of materials to be employed, yet producing high impact plastic compositions clearly would be desirable from a practical and commercial standpoint.

OBJECTS OF THE INVENTION

It is an object of the invention to provide novel high impact plastic compositions. It is a further object of the invention to provide a novel process for the production of high impact plastic compositions.

Other aspects, objects, and the several advantages of our invention will be apparent to one skilled in the art from the following disclosure and our appended claims.

BRIEF DESCRIPTION OF THE INVENTION

By utilizing branched block elastomeric copolymers dissolved in a vinylidene group containing monomeric mixture to form a rubber-in-monomer solution, and polymerizing this rubber-in-monomer solution in a suspension system, a polymeric product is produced which exhibits a desirable high impact nature without need for a subsequent crosslinking step. Thus, our process is simpler and more economical, and, as can be seen from data included in this disclosure, more effective or at least as effective as more complex methods as far as the resulting high impact plastic composition is concerned.

DETAILED DESCRIPTION OF THE INVENTION

Branched block rubbery copolymers are dissolved in a vinylidene group-containing monomer medium, preferably a monovinyl-substituted aromatic compounds/polymerizable nitrile monomer mixture. The resulting rubber-in-monomer solution then is suspension polymerized utilizing a free radical initiator for graft copolymerization of the polymerizable monomers. The resulting polymeric product is recovered in bead form from the suspension polymerization process, and can then be used for a variety of product formulations.

The branched block copolymers suitable for the process of our invention may be characterized as radial block copolymers. These branched block polymers are copolymers of at least one conjugated diene and at least one monovinyl-substituted aromatic compound, are rubbery or elastomeric, and are unsaturated at least to the extent of having at least enough unsaturation to be characterized as vulcanizable.

The end groups of the branched block copolymers preferably are styrene or substituted-styrene end groups. Utilizing branched block copolymers with styrene end blocks or groups avoids gelation during the suspension polymerization, reduces solution viscosity for use in processing, and apparently tends to facilitate formation of graft copolymers in the process where one of the polymerizable monomers is a monovinyl-substituted aromatic compound. These branched block rubbery copolymers should have a suitable branch length to achieve the desired properties in the grafted product, though the branch lengths can vary somewhat depending on the monomers and the intended use of the final graft copolymer.

The branched block copolymers, characterized as rubbery and unsaturated, contain at least one copolymerized conjugated diene and at least one copolymerized monovinyl-substituted aromatic compound. Any conjugated diene polymerizable with an alkali metal initiator, organolithium preferably, or organosodium, -potassium, -cesium, -rubidium, all as are known in the polymerization arts, can be utilized; and any copolymerizable monovinyl-substituted aromatic compound polymerizable with such initiators can be utilized.

The more readily available polymerizable conjugated dienes contain 4 to 12 carbon atoms per molecule and preferably from a commercial standpoint are those of 4 to 8 carbon atoms per molecule, particularly 1,3-butadiene, isoprene, and piperylene, though such as 2,4-dimethyl-1,3-butadiene, 1,3-octadiene, 4,5-diethyl-1,3-octadiene, and the like, can be utilized, alone or in admixture or by sequential polymerization.

The copolymerizable monovinyl-substituted aromatic compound can be any polymerizable monomer of this class copolymerizable with the conjugated diene employing an alkali metal-based initiator, such as those of 8 to 20, more particularly for commercial availability 8 to 12, carbon atoms per molecule, including the presently preferred styrene, various of the alkyl styrenes such as 3-methylstyrene, 3-ethylstyrene, 4-n-propylstyrene, 4-cyclohexylstyrene, 4-decylstyrene, 2-ethyl-4-benzylstyrene; the alpha or beta-substituted styrene such as alpha-methyl styrene and 1-propenylbenzene; and also 1-vinylnaphthalene, and similar derivatives of the vinylnaphthalenes as have been described for the styrenes; and the like, alone or in admixture, or by sequential addition.

The polymerizable conjugated diene, one or more, and the polymerizable monovinyl-substituted aromatic compound, one or more, are polymerized with an organomonoalkali metal initiator by processes known in the art, such as by sequential addition, so as to produce a block copolymer containing an active alkali metal atom, e.g., a carbon-alkali metal bond, on the conjugated diene end of the polymer chain.

Among the suitable organoalkali metal initiators are those which can be represented by such as RLi in which R represents a hydrocarbyl radical of aliphatic, cycloaliphatic, or aromatic nature, of up to about 20 carbon atoms per molecule, although higher molecular weight initiators can feasibly be employed. Examples include methyllithium, the presently preferred n-butyllithium, or others as known in the art. Use of the initiators, amounts, and the like, in preparation of suitable block copolymers is known and need not be repetitiously repeated here. Polymerization temperatures, controls, methods, also are known and need not be further described.

The amount of polymerizable conjugated diene employed in preparing the block copolymer can vary about 40 to 95 parts by weight per 100 parts by weight of monomers employed, the remainder being substantially copolymerizable monovinyl-substituted aromatic compound. Preferably, the block copolymer contains about 60 to 85 parts by weight of polymerized conjugated diene per 100 parts of total polymerized monomer.

At the conclusion of the polymerization to prepare the block copolymer, a polyfunctional treating agent which contains at least three reactive sites is added to the unquenched, i.e., otherwise unterminated, reaction or polymerization mixture. The polyfunction compound contains at least three, preferably 3 to 7, reactive sites capable of reacting with the carbon-lithium bond on the end of the conjugated diene block of the polymer chain and adding to the carbon possessing this bond. The resulting polymer is a radial or branched block copolymer having branches which can be visualized as radiating from a nucleus formed by the polyfunctional compound, with the blocks of polymerized conjugated diene of the block copolymer toward the center of the radial block polymer, and the polymonovinyl aromatic compound blocks of the block copolymer at the outer extremities.

Conditions for the coupling or branching reaction are known in the art and need not be recited here, being fully described by Zelinski and Hsieh in U.S. Pat. 3,281,383, patented Oct. 25, 1966, and by Childers in U.S. Pat. 3,637,554, patented Oct. 25, 1972. The polyfunctional agents used to form the radial block copolymers include such as polyepoxides, polyisocyanates, polyimines, polyaldehydes, polyhalides such as the silicon or tin tetrahalides, and the like. The amount of polyfunctional treating agent can vary, but preferred for most efficient coupling is a range of about 1 to 1.5 equivalents of treating agent based on the lithium or other alkali metal present in the polymer.

After coupling, the now-branched polymer can be recovered from the polymerization mixture by conventional methods, such as terminating with water, acid, alcohol, or other, removal of solvent, drying, and the like.

In the practice of our process, the branched block copolymers are dissolved in vinylidene group-containing monomers. The vinylidene group-containing monomers include vinyl-substituted aromatic compounds, alpha, beta-unsaturated nitriles, esters of acrylic acid, esters of alkacrylic acid, vinyl esters such as vinyl acetate, vinyl butarate, and the like. The number of carbon atoms per molecule in such monomers ranges from 3 to 30 or more carbon atoms per monomer molecule, presently preferably up to 18 carbon atoms per molecule, more preferably for availability up to 12 carbon atoms per molecule. These monomers include, for example, the presently preferred styrene plus either acrylonitrile or methacrylonitrile; as well as alphamethylstyrene, methyl methacrylate, 4-vinylbiphenyl, 2-vinylnaphthalene, and the like. Other useful monomers include the maleinimides and olefinically unsaturated heterocyclic compounds polymerizable through the olefinic unsaturation. Related monomers such as the dialkyl maleates or fumarates also are useful within the context of this invention. Mixtures of monomers may be employed.

The amount of the branched block copolymer dissolved in the vinylidene group-containing monomer or monomers can be of any broad range suitable or desired depending on the particular branched block copolymer and monomer characteristics. For commercial convenience in materials handling in suspension polymerization processes, a range of about 5 to 40 percent by weight based on the combined weight of branched block copolymer and monomers presently is considered suitable and convenient. Presently preferred are the use of monomer mixtures in which a vinylidene nitrile-containing monomer is one component thereof and constitutes up to about 95 weight percent of the monomer mixture excluding rubber. Especially useful products for many purposes may be obtained by the use of monomer mixtures containing 0 up to about 50, preferably 0 to about 35, parts by weight of acrylonitrile per 100 parts of monomer mixture. Thus, preparation of impact polystyrenes is included within the scope of our invention.

Chain transfer agents may be added, if desired, to the polymerization mixture for molecular weight control of the polymer. Chain transfer agents include the alkyl, n-, sec-, or tert-, mercaptans preferably having 4 to 16 carbon atoms per molecule, such as t-dodecyl mercaptan, n-dodecyl mercaptan, and the like. Other useful agents include nonalkyl mercaptans; the lower alkyl xanthogens such as diisopropyl xanthogen; alpha-bromoethylbenzene, alpha-chloroethylbenzene, carbon tetrabromide; alpha-methylstyrene dimer; and the like. Such modifiers can be added in an amount sufficient for the effect desired, typically about 0.4 to 1.5 weight percent of the total weight of polymerization mixture.

The amount of water employed in suspension polymerization can vary widely depending on the reactor employed, agitation means, and the like. It presently is preferred to employ sufficient water such that in the final suspension mixture water represents about 20 to 80 percent by weight of the total polymerization mixture including water. The time employed for polymerization is that sufficient for the conversion desired, varies depending on other reaction parameters such as the temperature chosen, and can range from a very few minutes to such as 48 hours or more, preferably at least 2 to 16 hours. The temperature employed in the suspension polymerization is at least sufficient to induce decomposition of the free radical initiator. A suitable expedient temperature range is from about 50° to 150° C.

Although the suspension polymerization reaction may proceed thermally, it is preferable to incorporate into the polymerization system a free-radical generating initiator. Initiators useful in the context of this invention include the monomer-soluble organic peroxides, such as di-t-butyl peroxide, benzoyl peroxide, lauroyl peroxide, toluyl peroxide, t-butyl peracetate, t-butyl perbenzoate, dicumyl peroxide, 2,5-dimethyl-2,5-di(t-butylperoxy)hexane, 2,5-dimethyl-2,5-di(t-butylperoxy)hexyne-3, t-butyl hydroperoxide, cumene hydroperoxide, p-menthane hydroperoxide, cyclopentane hydroperoxide, diisopropylbenzene hydroperoxide, pinene hydroperoxide, 2,5-dimethylhexane-2,5-dihydroperoxide, and the like, and mixtures thereof; as well as any of the monomer-soluble azo initiators useful in suspension polymerization systems such as 2,2'-azobis(2-methylpropionitrile), 2,2'-azobis(2-methylvaleronitrile), and the like, and mixtures. The quantity of initiator employed usually ranges from about 0.005 to 1 weight percent of the total weight of monomers charged, though this may be varied as desired dependent on the reactants, temperatures, and the like.

Suspending agents can be employed including finely divided inorganic solids such as titanium dioxide, tricalcium phosphate, and the like, formed separately and added to the suspension system, or preferably formed in situ.

EXAMPLES

The following examples are intended to further illustrate our invention and to assist those skilled in the art to a further understanding of our invention. Particular runs, exemplary species, amounts, and the like, are intended to be illustrative and not limitative of the reasonable and proper scope of our invention.

EXAMPLE I

A series of runs was conducted in which 75/25 weight ratio butadiene/styrene block copolymers were prepared and coupled to afford various degrees of branching, and then employed, in accordance with the invention, as the rubbery component in the preparation of ABS graft copolymers by suspension polymerization.

PREPARATION OF BD/S BLOCK COPOLYMERS

Coupled 75/25 butadiene/styrene copolymers were prepared by the recipe shown below. The ingredients are listed in the charge order used.

and allowed to dissolve in styrene/acrylonitrile monomer mixture solution at 25°–50° C. after which other ingredients were added as per the following polymer solution composition:

Polymer Solution Composition

| Runs | 1 | 2 | 3 | 4 |
|---|---|---|---|---|
| Rubber employed | A | B | C | D |
| Amount | 15 | 15 | 15 | 15 |
| Styrene/acrylonitrile 70/30 | 85 | 85 | 85 | 85 |
| Cyclohexane | 85 | 85 | 0 | 0 |
| t-Dodecylmercaptan (chain transfer agent) | 1 | 1 | 0.5 | 0.5 |
| t-5 Butyl peroctoate (initiator) | 0.1 | 0.4 | 0.4 | 0.4 |

A suspension-dispersion formulation was prepared as follows:

Suspension-Dispersion Formulation

| | Parts by Weight |
|---|---|
| Water | 166 |
| $Na_3PO_4 \cdot 12\ H_2O$ | 2.45 |
| $CaCl_2 \cdot 2\ H_2O$ | 1.75 |
| Water | 33.3 |
| Casein derivative | 0.010 |

Separate aqueous solutions of sodium phosphate and of calcium chloride were prepared at about 100° C. and then combined to precipitate finely divided calcium phosphate as suspending agent. After cooling, Cascoloid ST56, a casein derivative from Borden Chemical Co., was added.

Each respective polymer-solution composition and the suspension-dispersion formulation were combined and the respective mixtures agitated at about 80° C. for 8 hours. After suspension polymerization, each mixture was acidified with dilute hydrochloric acid, and the ABS graft copolymers, obtained in the form of small beads, were water-washed, collected by filtration, and dried at about 80° C. under reduced pressure.

A 130 gram sample of each of the graft ABS copolymer 1, 2, 3, and 4 was divided into two 65 gram portions. Each such portion was milled under nitrogen in a Brabender Plastograph at 210° C. at 10 rpm until Block Copolymer Recipe

| Rubber | A | B | C | D |
|---|---|---|---|---|
| Cyclohexane, phm[a] | 722 | 722 | 722 | 722 |
| Styrene, pbw[b] | 25 | 25 | 25 | 25 |
| Tetrahydrofuran, phm | 0.1 | 0.1 | 0.1 | 0.1 |
| n-Butyllithium, mhm[c] | 1.0 | 1.5 | 2.0 | 3.0 |
| Temp. °C. for polym. of styrene block | 70 | 70 | 70 | 70 |
| Time, hr. for polym. of styrene block | 0.5 | 0.5 | 0.5 | 0.5 |
| Butadiene, pbw | 75 | 75 | 75 | 75 |
| Temp. °C. for polym. of butadiene block | 70 | 70 | 70 | 70 |
| Time, hr. for polym. of butadiene block | 1 | 1 | 1 | 1 |
| Coupling agent, mhm | 1.5[d] | 0.5[e] | 0.625[f] | 0.5[g] |
| 2,6-di-t-butyl-4-methylphenol, phm | 1.6 | 1.6 | 1.6 | 1.6 |

[a]Parts per hundred parts monomer
[b]Parts by weight
[c]Gram millimoles per hundred grams monomer. The amounts employed in the runs were adjusted to keep the molecular weight effectively constant as the degree of branching increased.
[d]Dimethyldichlorosilane
[e]Methyltrichlorosilane
[f]Silicon tetrachloride, 0.375 added in one increment followed by four increments of 0.0625 each added at one minute intervals
[g]Hexachlorodisilane A portion of each butadiene/styrene rubbery block copolymer A, B, C, and D was divided into small pieces fluxing occurred. Then, to each portion of each graft copolymer thus in the molten state was added a stabiliz-

TABLE II

| Run No. | Melt Flow[a] 200°C 5 Kg | Flexural Modulus[b] Psi × 10⁻³ | Tensile[c] Psi | Elongation[c] % | Izod Impact[d] ft/lbs. in Notch |
|---|---|---|---|---|---|
| 1-a | 1.12 | 312 | 5810 | 12 | 4.4 |
| 1-b | 0.67 | 320 | 5570 | 26 | 3.2 |
| 2-a | 0.84 | 328 | 5840 | 20 | 5.1 |
| 2-b | 0.55 | 320 | 5630 | 41 | 3.5 |
| 3-a | 0.1 | 318 | 6000 | 61 | 3.9 |
| 3-b | 0.22 | 322 | 5520 | 57 | 6.4 |
| 4-a | 0.1 | 348 | 6560 | 13 | 1.7 |
| 4-b | 0.31 | 324 | 5680 | 71 | 5.6 |

[a] ASTM D 1238-65T Condition G
[b] ASTM D 790-63
[c] ASTM D 412-66
[d] ASTM D 256-56 ing admixture of 0.65 gram of an antioxidant mixture (0.13 gram of 2,6-di-t-butyl-4-methylphenol, 0.303 gram of tris(nonylphenyl)-phosphite, and 0.216 gram of dilaurylthiodipropionate), and 0.33 gram of calcium stearate as processing aid. To one sample of each pair of graft copolymer portions also was added 0.065 gram of dicumyl peroxide. Thus, each pair then represented one composition 1-a, 2-a, 3-a, 4-a, according to the invention, and one composition 1-b, 2-b, 3-b, 4-b to be further milled with dicumyl peroxide as taught by the prior art in order to obtain comparative test data showing the effects of peroxide treatment of graft copolymers as is presently conventional required practice. Each such portion, whether or not it contained the peroxide, then was milled in a Brabender Plastograph at 210° C. for 3 minutes at 150 rpm.

The weight average molecular weight, degree of branching, and inherent viscosity values were determined for each ungrafted rubbery block copolymer A, B, C, D and appear in Table I below:

Block Copolymer Recipe

| Rubber | E | F | G | H | I | J |
|---|---|---|---|---|---|---|
| Cyclohexane, phm | 722 | 722 | 722 | 722 | 722 | 722 |
| Styrene, pbw | 25 | 25 | 25 | 25 | 25 | 25 |
| Tetrahydrofuran, phm | 0.1 | 0.1 | 0.1 | 0.1 | 0.1 | 0.1 |
| Butyllithium, mhm | 1 | 3 | 6 | 0.33 | 1 | 2 |
| Temp.°C. for polym. of styrene block | 70 | 70 | 70 | 70 | 70 | 70 |
| Time, hr. for polym. of styrene block | 0.5 | 0.5 | 0.5 | 0.5 | 0.5 | 0.5 |
| Butadiene, pbw | 75 | 75 | 75 | 75 | 75 | 75 |
| Temp. °C. for polym. of butadiene block | 70 | 70 | 70 | 70 | 70 | 70 |
| Time, hr. for polym. of butadiene block | 1 | 1 | 1 | 1 | 1 | 1 |
| Coupling agent, mhm | none | 1[a] | 1[b] | none | 0.33[a] | 0.33[b] |
| 2,6-di-t-butyl-methylphenol, phm | 1.6 | 1.6 | 1.6 | 1.6 | 1.6 | 1.6 |

[a] Methyltrichlorosilane
[b] Hexachlorodisilane

TABLE I

Block Copolymer Properties

| Rubber No. | Butadiene/ Styrene Ratio | $M_w \times 10^{-3}$ | Number of Branches[a] | I.V.[b] |
|---|---|---|---|---|
| A | 75/25 | 223 | 2 | 1.65 |
| B | 75/25 | 239 | 3 | 1.64 |
| C | 75/25 | 275 | 4 | 1.45 |
| D | 75/25 | 224 | 6 | 1.14 |

[a] Number of branches in branched polymer determined by gel permeation chromatograph
[b] Inherent viscosity determined in tetrahydrofuran solution Each grafted and milled ABS copolymer 1-A, 1-B, 2-A, 2-B, 3-A, 3-B, 4-A, 4-B sample was tested for various properties, with results as shown below:

Conversion in each graft copolymerization run was 96–95 weight per cent, based on the weight conversion of styrene-acrylonitrile.

The data in Table II above reflects a maximum izod impact value for runs of the invention 1-a, 2-a, 3-a, 4-a at the tri-chain branching level, and a minimum at the hexa-chain level. As shown in Table I, the molecular weight of each block copolymer employed A, B, C, D was essentially constant, and thus the length of each branch of the block copolymers was less with an increase in the number of branches per molecule. The branch length in the hexa-chain product was too low for optimum performance.

EXAMPLE II

A further series of runs was made employing 75/25 butadiene/styrene rubbery block copolymers as the rubbery component in preparation of ABS plastic resins by suspension polymerization. In the preparation of 75/25 butadiene/styrene block copolymers, the general procedure of Example I was followed, using the following recipe:

The butadiene/styrene block copolymer rubbers prepared as per above recipes were prepared for suspension polymerization employing the procedures as described in Example I, suspension polymerized, and recovered. Each grafted copolymer then was divided into two portions and subjected to mixing as before described relative to the rubbers of the invention and the rubbers containing the further peroxide coupling agent as previously required by the prior art. Rubbers E through J were used to prepare grafted copolymers 5 through 10 respectively.

Physical properties of the several ungrafted block copolymer rubbers E through J inclusive were determined as per Table III below:

TABLE III

| Rubber | Block Copolymer Properties | | | |
|---|---|---|---|---|
| | Butadiene/Styrene Ratio | $M_n \times 10^{-3}$ | Number of Branches | I.V. |
| E | 75/25 | 117 | 1 | 1.16 |
| F | 75/25 | 106 | 3 | 0.94 |
| G | 75/25 | 108 | 6 | 0.65 |
| H | 75/25 | 401 | 1 | 2.53 |
| I | 75/25 | 277 | 3 | 1.84 |
| J | 75/25 | 302 | 6 | 1.36 |

Each grafted and milled copolymer was tested for various properties, with results shown below:

TABLE IV

ABS Grafted Copolymer Properties

| Graft Run No. | Prepared From Copolymer | Melt Flow 200° C. 5 Kg | Flexural Modulus Psi × 10⁻³ | Tensile Psi | Elongation % | Izod Impact ft. lbs in Notch |
|---|---|---|---|---|---|---|
| 5-a | E | 0.09 | 369 | 6440 | 11 | 0.5 |
| 5-b | | 0.14 | 347 | 6140 | 25 | 2.8 |
| 6-a | F | 0.15 | 354 | 6470 | 15 | 2.3 |
| 6-b | | 0.38 | 343 | 6400 | 31 | 2.0 |
| 7-a | G | 0.40 | 358 | 6930 | 10 | 0.4 |
| 7-b | | 0.89 | 325 | 6460 | 11 | 2.2 |
| 8-a | H | 0.57 | 339 | 5770 | 15 | 2.2 |
| 8-b | | 0.59 | 333 | 5270 | 61 | 2.1 |
| 9-a | I | 0.67 | 349 | 6230 | 22 | 4.5 |
| 9-b | | 0.70 | 332 | 5750 | 30 | 2.9 |
| 10-a | J | 0.19 | 332 | 6200 | 53 | 7.5 |
| 10-b | | 0.49 | 313 | 5570 | 75 | 5.8 |

The data in Table IV indicate that among graft copolymers 5-a, 6-a, and 7-a, the maximum Izod impact value occurs with the tri-chain structure, 6-a, and the minimum value occurs with the hexa-chain structure, 7-a, for reasons discussed in Example I. The impact performance values of the graft copolymers 6-a and 7-a are inferior to those of corresponding graft copolymers 2-a and 4-a shown in Table II, in view of the lower molecular weights and therefore shorter chain branches present in copolymers F and G. The polymers E and H were not branched or coupled since no coupling agent was employed as per recipe given. In runs with rubbers H, I, and J, impact performance improved with increased branching since the molecular weights were sufficiently high to afford branches of effective length even in the instance of the hexa-chain structure. Note the superiority of the grafted copolymers runs 9-a and 10-a of the inventive graft copolymers over those made with dicumyl peroxide in the hot mixing peroxide crosslinking step 9-b and 10-b.

EXAMPLE III

Further runs were made employing a 75/25 butadiene/styrene random copolymer as the rubbery component in the ABS system. Otherwise, the procedures as described in Example I for preparation of the polymer and subsequent suspension graft polymerization were followed, except that a randomizing agent was added with the monomers for preparation of the copolymer, and the following polymerization recipe was employed:

Random Copolymer Recipe

| Rubber | K | L | M | N | O |
|---|---|---|---|---|---|
| Cyclohexane, phm | 722 | 722 | 722 | 722 | 722 |
| Styrene, pbw | 25 | 25 | 25 | 25 | 25 |
| Butadiene, pbw | 75 | 75 | 75 | 75 | 75 |
| Tetrahydrofuran, phm | 3 | 3 | 3 | 3 | 3 |
| n-Butyllithium, mhm | 0.5 | 1.0 | 1.5 | 2.0 | 3.0 |
| Polymerization Temp. °C. | 70 | 70 | 70 | 70 | 70 |
| Polymerization Time, hrs. | 1 | 1 | 1 | 1 | 1 |
| Coupling Agent, mhm | 0 | 0.5⁽ᵃ⁾ | 0.5⁽ᵇ⁾ | 0.625⁽ᶜ⁾ | 0.5⁽ᵈ⁾ |
| 2,6-di-2-butyl-4-methylphenol, phm | 1.6 | 1.6 | 1.6 | 1.6 | 1.6 |

⁽ᵃ⁾Dimethyldichlorosilane
⁽ᵇ⁾Methyltrichlorosilane
⁽ᶜ⁾Silicone tetrachloride: 0.375 added in one increment followed by four increments of 0.0625 each added at one minute intervals
⁽ᵈ⁾Hexachlorodisilane The rubbers K through O then were dissolved in styrene/acrylonitrile 70/30 monomer mixture to the extent of 15 per cent rubber and 85 per cent monomer mixture, and polymerized in a suspension polymerization system, all as before described. Conversions of 95–94 per cent were obtained in each run relative to the styrene and acrylonitrile. The graft copolymers runs 11 through 15 prepared using random copolymer K through O respectively were divided into two portions, with one portion of each crosslinked with added dicumyl peroxide, as described hereinbefore, and all portions hot-milled.

The random copolymer rubbers K through O were examined for properties as before:

TABLE V

Random Copolymer Properties

| Rubber | Butadiene/Styrene | $M_w \times 10^{-3}$ | Number of Branches | I.V. |
|---|---|---|---|---|
| K | 75/25R[a] | 240 | 1 | 1.78 |
| L | 75/25R | 194 | 2 | 1.49 |
| M | 75/25R | 213 | 3 | 1.32 |
| N | 75/25R | 262 | 4 | 1.24 |
| O | 75/25R | 229 | 6 | 1.06 |

[a]Random

The following results were obtained upon examination of the grafted hot-milled polymers:

TABLE VI

ABS Grafted Copolymer Properties

| Grafted Run No. | Prepared From Copolymer | Melt Flow | Flexural Modulus | Tensile | Elongation | Izod Impact |
|---|---|---|---|---|---|---|
| 11-a | K | 0.19 | 304 | 5960 | 45 | 4.7 |
| 11-b |   | 0.35 | 267 | 5190 | 67 | 5.9 |
| 12-a | L | 0.19 | 313 | 6520 | 17 | 1.4 |
| 12-b |   | 0.46 | 276 | 5440 | 77 | 5.5 |
| 13-a | M | 0.23 | 326 | 6440 | 17 | 0.6 |
| 13-b |   | 0.54 | 290 | 5570 | 85 | 5.5 |
| 14-a | N | 0.28 | 316 | 6470 | 14 | 0.8 |
| 14-b |   | 0.54 | 290 | 5470 | 47 | 6.0 |
| 15-a | O | 0.50 | 304 | 6310 | 11 | 0.7 |
| 15-b |   | 0.66 | 278 | 5620 | 43 | 5.8 |

The above results with Runs 12-a, 13-a, 14-a, 15-a clearly show the nonsuitability of the use of branched random butadiene/styrene copolymers in the process of our invention in place of the branched block copolymers illustrated in Examples I and II.

EXAMPLE IV

Further runs were made using a rubbery polybutadiene homopolymer as the rubbery component. The rubbery polybutadiene was prepared by the following recipe:

| Rubber | Homopolymer Recipe | | | | |
|---|---|---|---|---|---|
|  | P | Q | R | S | T |
| Cyclohexane, phm | 722 | 722 | 722 | 722 | 722 |
| Butadiene, pbw | 100 | 100 | 100 | 100 | 100 |
| Tetrahydrofuran, phm | 0.1 | 0.1 | 0.1 | 0.1 | 0.1 |
| n-Butyllithium, mhm | 0.5 | 1.0 | 1.5 | 2.0 | 3.0 |
| Polymerization Temp. °C. | 70 | 70 | 70 | 70 | 70 |
| Polymerization Time, hrs. | 1 | 1 | 1 | 1 | 1 |
| Coupling Agent, mhm | 0 | 0.5[a] | 0.5[b] | 0.625[c] | 0.5[d] |
| 2,6-di-t-butyl-4-methylphenol, phm | 1.6 | 1.6 | 1.6 | 1.6 | 1.6 |

[a]Dimethyldichlorosilane
[b]Methyltrichlorosilane
[c]Silicon tetrachloride; 0.375 added in one increment followed by four increments of 0.0625 each added at one minute intervals
[d]Hexachlorodisilane The polybutadienes P through T were subjected to graft polymerization in a suspension system employing 70/30 styrene/acrylonitrile monomer mixture as described before, except employing 11.25 weight percent of polybutadiene rubber and the balance styrene/acrylonitrile mixture. Otherwise the same suspension polymerization recipe was employed, and the corresponding grafted copolymers 16 through 20 respectively were recovered. Conversion was 94–96 percent in each run relative to the conversion of styrene and acrylonitrile. The grafted copolymers 16 through 20 each was divided into two portions a and b; to the b portion of each pair then was added dicumyl peroxide as described in Example I, each sample a and b then subjected to the hot-milling step as described previously, and finally stabilized.

The rubbery polybutadienes P through T were examined with the following results:

TABLE VII

Homopolymer Properties

| Polybutadiene Run No. | $M_w \times 10^{-3}$ | Number of Branches | I.V. |
|---|---|---|---|
| P | 227 | 1 | 2.18 |
| Q | 187 | 2 | 1.92 |
| R | 187 | 3 | 1.79 |
| S | 193 | 4 | 1.47 |
| T | 195 | 6 | 1.19 |

These grafted hot-milled rubbers were examined with the following results obtained:

TABLE VIII

ABS Graft Copolymer Properties

| Grafted Run No. | Prepared From Rubber | Melt Flow | Flexural Modulus | Tensile | Elongation | Izod Impact |
|---|---|---|---|---|---|---|
| 16-a | P | 0.06 | 347 | 6070 | 13 | 2.2 |
| 16-b |   | 0.17 | 319 | 6000 | 42 | 6.5 |
| 17-a | Q | 0.10 | 351 | 6360 | 10 | 1.0 |
| 17-b |   | 0.25 | 321 | 5800 | 79 | 6.5 |
| 18-a | R | 0.19 | 351 | 6350 | 11 | 1.0 |
| 18-b |   | 0.45 | 320 | 5580 | 58 | 6.0 |
| 19-a | S | 0.30 | 337 | 6360 | 7 | 1.0 |
| 19-b |   | 0.56 | 307 | 5890 | 37 | 5.1 |
| 20-a | T | 0.52 | 341 | 6740 | 7 | 0.4 |
| 20-b |   | 0.77 | 321 | 5830 | 17 | 4.8 |

The nonsuitability of polybutadiene branched or otherwise as the rubbery component is illustrated by the low Izod impact values in the runs 16-a, 17-a, 18-a, 19-a, 20-a above.

Polymer stabilizers, e.g., antioxidants, can be added either before or after polymerization, and either before or after the hot mixing step, depending upon the type of antioxidant employed. The polymers can be compounded with a wide variety of fillers, plasticizers, pigments, reinforcing fibers and the like, for various purposes.

Certainly, reasonable variations and modifications of our invention are possible yet still within the scope of our disclosure and without departing from the intended scope and spirit thereof.

We claim:
1. A process for the preparation of high impact plastic compositions which comprises the steps of:
   a. polymerizing at least one polymerizable monovinyl-substituted aromatic compound employing an organo monoalkali metal initiator under polymerization conditions, thereby forming a block of said monovinyl-substituted aromatic compound,
   b. further polymerizing onto the monovinyl-substituted aromatic compound polymer block from said step (a) at least one copolymerizable conjugated diene, thereby forming onto said block of monovinyl-substituted aromatic compound polymer a block of polymerized conjugated diene with a carbon-lithium bond on the end thereof,
   wherein the resulting block copolymer contains about 40 to 95 parts by weight copolymerized conjugated diene and correspondingly about 60 to 5 parts by weight copolymerized monovinyl-substituted aromatic compound, said copolymer characterized by sufficient unsaturation as to be vulcanizable,
   c. reacting the block copolymer from said step (b) with a polyfunctional compound containing 3 to 7 reactive sites per molecule capable of reacting with the carbon-lithium bond on the end of the conjugated diene block of the copolymer prepared in said step (b), said polyfunctional compound is selected from the group consisting of epoxides, isocyanates, imines, aldehydes, and halides, thereby preparing a radial block copolymer characterized in that the end blocks are derived from said monovinyl-substituted compound,
   d. dissolving the radial block copolymer resulting from said step (c) in at least one vinylidene group containing monomer selected from the group consisting of monovinyl-substituted aromatic compounds, alpha, beta-unsaturated nitriles, esters of acrylic acid, esters of alkacrylic acid, vinyl esters, maleinimides, dialkyl maleates, dialkyl fumarates, or mixtures, of which a vinylidine nitrile monomer constitutes up to about 95 weight percent, wherein said vinylidene group containing monomer contains up to 30 carbon atoms per molecule, thereby preparing a rubber-in-monomer solution,
   e. suspension polymerizing under aqueous suspension polymerization conditions said rubber-in-monomer solution,
   f. recovering the product of said aqueous suspension polymerization as a high impact plastic composition.

2. The process according to claim 1 wherein in said step (d) said copolymer from said step (c) represents about 5 to 40 percent by weight based on the combined weight of copolymer and vinylidene group containing monomer in said step (d).

3. The process according to claim 1 wherein said vinylidene nitrile containing monomer comprises acrylonitrile.

4. The process according to claim 3 wherein said vinylidene group containing monomers comprise acrylonitrile and styrene, and said branched block copolymer is a copolymer of butadiene and styrene.

5. In the preparation of high impact plastic compositions wherein an unsaturated rubbery copolymer is dissolved in at least one vinylidene group containing monomer and thereafter suspension polymerized under aqueous suspension polymerization conditions employing a free radical initiator, the improvement which comprises employing as said rubbery copolymer an unsaturated branched block copolymer of at least one polymerizable conjugated diene and at least one copolymerizable monovinyl-substituted aromatic compound characterized as a radical block copolymer prepared by polymerizing a monovinyl-substituted aromatic compound monomer under polymerization conditions employing an organo-alkali metal initiator, thereby forming a block of said monovinyl-aromatic compound monomer, polymerizing thereon a block of at least one polymerizable conjugated diene, thereby producing block copolymer, and thereafter branching said block copolymer with a polyfunctional treating agent containing at least three reactive sites per molecule reactable with a carbon-lithium bond and selected from the group consisting of polyepoxides, polyisocyanates, polyimines, polyaldehydes, and polyhalides thereby producing a branched block copolymer, wherein the end blocks of said branched block copolymers are said monovinyl-substituted aromatic compound blocks, and the degree of unsaturation in said unsaturated branched block polymer is characterized as sufficient to be vulcanizable;

and wherein said vinylidene group containing monomer in said suspension is selected from the group consisting of monovinyl-substituted aromatic compounds, alpha,beta-unsaturated nitriles, esters of acrylic acid, esters of alkacrylic acid, and vinyl esters, containing up to 18 carbon atoms per molecule.

6. The process according to claim 5 wherein said branched block copolymer is characterized as at least three copolymer blocks branching from nuclei formed by polyfunctional compounds,
   wherein said polymerizable conjugated diene contains 4 to 12 carbon atoms per molecule, and said copolymerizable monovinyl-substituted aromatic compound contains 8 to 20 carbon atoms per molecule.

7. The process according to claim 6 wherein each said copolymer block contains about 40 to 95 phm polymerized conjugated diene and correspondingly about 60 to 5 phm copolymerized monovinyl-substituted aromatic compound.

8. The process according to claim 7 wherein said polyfunctional treating agent contains 3 to 7 reactive sites per molecule.

9. The process according to claim 7 wherein is employed about 5 to 40 weight percent of said unsaturated branched block copolymer based on the combined weight of branched block copolymer and vinylidene group containing monomer.

10. The process according to claim 7 wherein said vinylidene group containing monomer includes at least one monovinyl-substituted aromatic monomer and at least one alpha,beta-unsaturated nitrile.

11. The process according to claim 10 wherein said alpha,beta-unsaturated nitrile monomer constitutes up to 95 weight percent of the vinylidene group containing monomer excluding said branched block copolymer.

12. The process according to claim 11 wherein said vinylidene group containing monomer contains up to 50 weight percent alpha,beta-unsaturated nitrile monomer and correspondingly up to 50 weight percent of monovinyl-substituted aromatic monomer.

13. The process according to claim 11 wherein said alpha,beta-unsaturated nitrile is acrylonitrile, and said monovinyl-substituted aromatic monomer is styrene.

14. The process according to claim 13 wherein said radial branched block copolymer is a copolymer of butadiene/styrene branched with a polyhalide.

15. The process according to claim 14 wherein said branched block copolymer is a butadiene/styrene 75/25 copolymer branched with methyltrichlorosilane.

16. The process according to claim 14 wherein said branched block copolymer is a butadiene/styrene 75/25 copolymer branched with silicontetrachloride.

17. The process according to claim 14 wherein said branched block copolymer is a butadiene/styrene 75/25 copolymer branched with hexachlorodisilane.

18. The process according to claim 12 wherein said monomer mixture is about 70/30 weight ratio styrene/acrylonitrile.

19. The process according to claim 8 wherein the number of branches of said branched block copolymer ranges from 3 to 6.

20. The process according to claim 19 wherein the number of branches is approximately 3.

21. The process according to claim 8 wherein said high impact composition is recovered from said suspension polymerization and hot mixed in the absence of cross-linking agent.

22. The process according to claim 21 wherein said hot-mixed high impact composition further is compounded with at least one filler, plasticizer, pigment, reinforcing fiber, or mixture.

* * * * *

UNITED STATES PATENT AND TRADEMARK OFFICE
CERTIFICATE OF CORRECTION

PATENT NO. : 3,903,201
DATED : September 2, 1975
INVENTOR(S) : Clifford W. Childers; Earl Clark It is certified that error appears in the above–identified patent and that said Letters Patent are hereby corrected as shown below:

Column 14, claim 5, line 17, "radical" should read --- radial ---; line 29, "consisiting" should read --- consisting ---.

Signed and Sealed this sixth Day of January 1976

[SEAL]

Attest:

RUTH C. MASON
Attesting Officer

C. MARSHALL DANN
Commissioner of Patents and Trademarks